(12) United States Patent
Dockser (10) Patent No.: US 8,595,279 B2
(45) Date of Patent: Nov. 26, 2013

(54) FLOATING-POINT PROCESSOR WITH REDUCED POWER REQUIREMENTS FOR SELECTABLE SUBPRECISION

(75) Inventor: Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1852 days.

(21) Appl. No.: 11/363,118

(22) Filed: Feb. 27, 2006

(65) Prior Publication Data

US 2007/0203967 A1    Aug. 30, 2007

(51) Int. Cl.
*G06F 7/38* (2006.01)
*G06F 1/00* (2006.01)

(52) U.S. Cl.
USPC .............. 708/513; 708/518; 713/324

(58) Field of Classification Search
USPC .................. 708/513, 518; 713/324
See application file for complete search history.

(56) References Cited

U.S. PATENT DOCUMENTS

| 5,987,616 | A | * | 11/1999 | Suzuki | ............ | 713/320 |
| 5,996,083 | A | * | 11/1999 | Gupta et al. | ................. | 713/322 |
| 7,020,789 | B2 | * | 3/2006 | Sperber et al. | ................ | 713/324 |
| 7,496,776 | B2 | * | 2/2009 | Kahle et al. | .................... | 713/324 |
| 2004/0143613 | A1 | | 7/2004 | Clemen et al. | | |
| 2005/0050372 | A1 | | 3/2005 | Hagiwara | | |
| 2005/0066205 | A1 | | 3/2005 | Holmer | | |

FOREIGN PATENT DOCUMENTS

| EP | 0583120 A1 | 2/1994 |
| JP | 2069822 | 3/1990 |
| JP | 6175823 A | 6/1994 |
| JP | 7146777 A | 6/1995 |
| JP | 2005078518 A | 3/2005 |
| KR | 20060066081 | 6/2006 |
| SU | 1280624 | 12/1986 |
| WO | 02057893 | 7/2002 |

OTHER PUBLICATIONS

International Search Report—PCT/US07/062908, International Search Authority—European Patent Office—Jul. 11, 2007.
Written Opinion—PCT/US07/062908, International Search Authority—European Patent Office—Jul. 11, 2007.

* cited by examiner

*Primary Examiner* — Chuong D Ngo
(74) *Attorney, Agent, or Firm* — Peter Michael Kamarchik; Nicholas J. Pauley; Joseph Agusta (57) ABSTRACT

A method and apparatus for performing a floating-point operation with a floating-point processor having a given precision is disclosed. A subprecision for the floating-point operation on one or more floating-point numbers is selected. The selection of the subprecision results in one or more excess bits for each of the one or more floating-point numbers. Power may be removed from one or more components in the floating-point processor that would otherwise be used to store or process the one or more excess bits, and the floating-point operation is performed with power removed from the one or more components.

33 Claims, 4 Drawing Sheets

FLOATING-POINT PROCESSOR WITH REDUCED POWER REQUIREMENTS FOR SELECTABLE SUBPRECISION

BACKGROUND

Floating-point processors are specialized computing units that perform certain mathematical operations, e.g., multiplication, division, trigonometric functions, and exponential functions, at high speed. Accordingly, powerful computing systems often incorporate floating-point processors, either as part of the main processor or as a coprocessor. A floating-point representation of a number commonly includes a sign component, an exponent, and a mantissa. To find the value of a floating-point number, the mantissa is multiplied by a base (commonly 2 in computers) raised to the power of the exponent. The sign is applied to the resultant value.

The precision of the floating-point processor is defined by the number of bits used to represent the mantissa. The more bits in the mantissa, the greater the precision. The precision of the floating-point processor generally depends on the particular application. For example, the ANSI/IEEE-754 standard (commonly followed by modern computers) specifies a 32-bit single format having a 1-bit sign, an 8-bit exponent, and a 23-bit mantissa. Only the 23 fraction bits of the mantissa are stored in the 32-bit encoding, an integer bit, immediately to the left of the binary point, is implied. The IEEE-754 also specifies a 64-bit double format having a 1-bit sign, an 11-bit exponent, and a 53-bit mantissa. Analogous to the single encoding, only the 52 fraction bits of the mantissa are stored in the 64-bit encoding, an integer bit, immediately to the left of the binary point, is implied. Higher precision results in a higher accuracy, but commonly results in increased power consumption.

The performance of floating-point arithmetic operations can entail computational inefficiency because floating-point processors are commonly limited to the precision provided by either the single format, or both the single and double formats. While some applications may require these types of precision, other applications may not. For example, some graphics applications may only require a 16-bit mantissa. For these graphics applications, any accuracy beyond 16 bits of precision tends to result in unnecessary power consumption. This is of particular concern in battery operated devices where power comes at a premium, such as wireless telephones, personal digital assistants (PDA), laptops, game consoles, pagers, and cameras, just to name a few. If it is known that an application always requires a certain reduced precision, the floating-point processor can be designed and built to that reduced precision. For general purpose processors, however, the common situation is that for certain applications, e.g. generating 3D graphics, a reduced precision may be acceptable, and for other applications, e.g. implementing Global Positioning System (GPS) functions, a greater precision may be needed. Accordingly, there is a need in the art for a floating-point processor in which the reduced precision, or subprecision, of the floating-point format is selectable. Power management techniques may also be employed to ensure that that the floating-point processor does not consume more power than necessary to support the selected subprecision.

SUMMARY

An aspect of a method of performing a floating-point operation with a floating-point processor having a precision format is disclosed. The method includes selecting a subprecision for the floating-point operation on one or more floating-point numbers, the selection of the subprecision resulting in one or more excess bits for each of the one or more floating-point numbers. The method further includes removing power from one or more components in the floating-point processor that would otherwise be used to store or process the one or more excess bits, and performing the floating-point operation with power removed from the one or more components.

One aspect of a floating-point processor having a precision format is disclosed. The floating-point processor includes a floating-point controller configured to select a subprecision for a floating-point operation on one or more floating-point numbers, the selection of the subprecision resulting in one or more excess bits for each of the one or more floating-point numbers, the floating-point controller being further configured to remove power from one or more components in the floating-point processor that would otherwise be used to store or process the one or more excess bits. The floating-point processor further includes a floating-point operator configured to perform the floating-point operation.

Another aspect of a floating-point processor having a precision format is disclosed. The floating-point processor includes a floating-point register having a plurality of storage elements configured to store a plurality of floating-point numbers, and a floating-point operator configured to perform a floating-point operation on the one or more of the floating-point numbers stored in the floating-point register. The floating-point processor further includes a floating-point controller configured to select a subprecision for a floating-point operation on said one or more of the floating-point numbers, the selection of the subprecision resulting in one or more excess bits for each of said one or more of the floating-point numbers, the one or more excess bits being stored in one or more of the storage elements of the floating-point register, and wherein the floating-point controller is further configured to remove power from the storage elements for the one or more excess bits.

A further aspect of a floating-point processor having a precision format is disclosed. The floating-point processor includes a floating-point register configured to store a plurality of floating-point numbers, and a floating-point operator having logic configured to perform a floating-point operation on the one or more of the floating-point numbers stored in the floating-point register. The floating-point processor further includes a floating-point controller configured to select a subprecision for a floating-point operation on said one or more of the floating-point numbers, the selection of the subprecision resulting in one or more excess bits for each of said one or more of the floating-point numbers, and wherein the floating-point controller is further configured to remove power a portion of the logic that would otherwise be used to process the one or more excess bits.

It should be understood that other embodiments of the floating-point processor, and of the method of performing floating-point operations, will become readily apparent to those skilled in the art from the following detailed description, in which various embodiments of the floating-point processor and of the method of performing floating-point operations are shown and described by way of illustration. As will be realized, other and different embodiments of the floating-point processor and of the method of performing floating-point operations are possible, and the details used to describe these embodiments are capable of modification in many respects. Accordingly, the drawings and the detailed description are to be regarded as illustrative in nature, and not as restrictive.

DETAILED DESCRIPTION

The detailed description set forth below in connection with the appended drawings is intended to describe various embodiments of the present disclosure, but is not intended to represent the only embodiments in which the present disclosure may be practiced. The detailed description includes specific details, in order to permit a thorough understanding of the present disclosure. It will be appreciated by those skilled in the art, however, that the present disclosure may be practiced without these specific details. In some instances, well-known structures and components are shown in block diagram form, in order to more clearly illustrate the concepts of the present disclosure.

In at least one embodiment of a floating-point processor, the precision for one or more floating-point operations may be reduced from that of the specified format. In addition, power management techniques may be employed to ensure that the floating-point processor does not consume more power than necessary to support the selected subprecision. Instructions provided to the floating-point processor to perform mathematical operations may include a programmable control field. The control field may be used to select the subprecision of the floating-point format and manage power consumption. By selecting the subprecision of the floating-point format, to that needed for a particular operation, thereby reducing the power consumption of the floating-point processor to support the selected subprecision, greater efficiency as well as significant power savings can be achieved.

Figure 1:
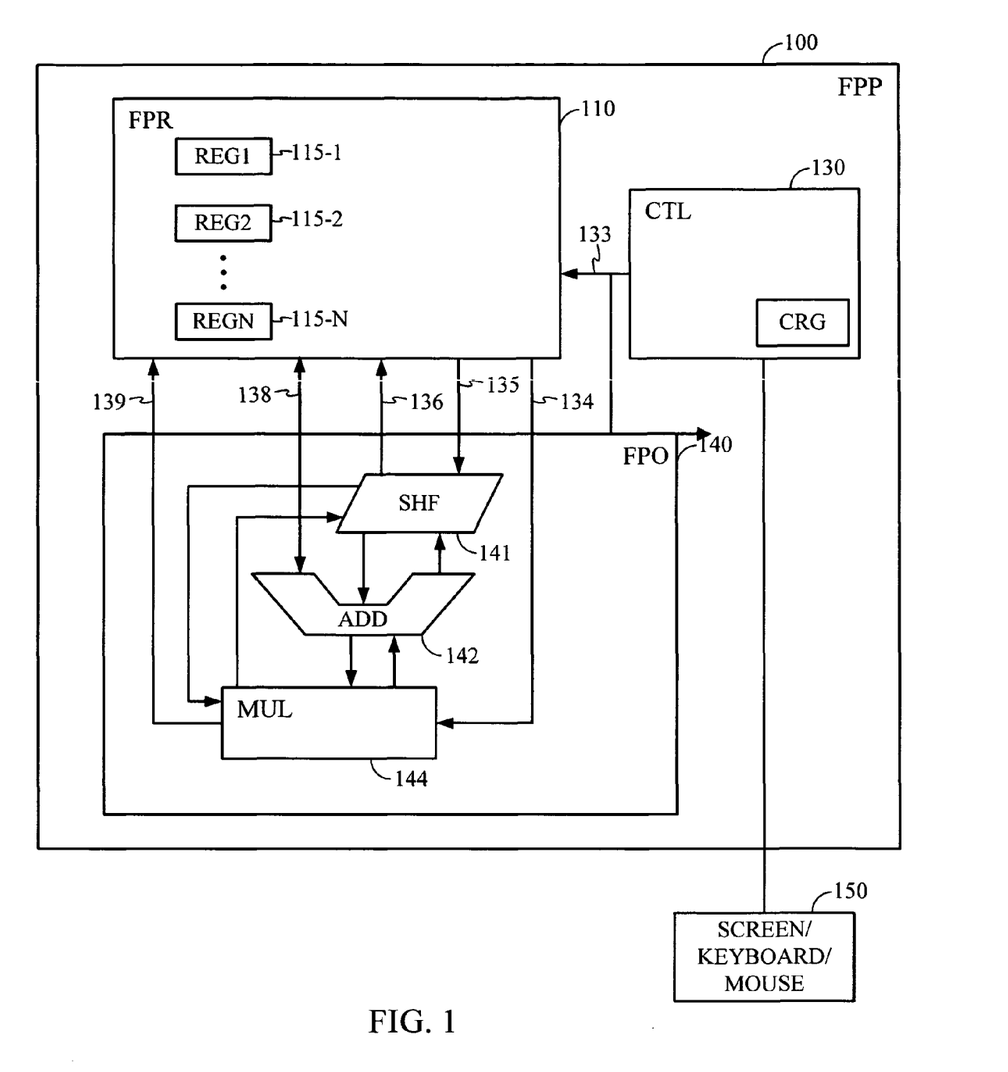
FIG. 1 is a functional block diagram illustrating an example of a floating-point processor with selectable subprecision.

FIG. 1 is a functional block diagram illustrating an example of a floating-point processor (FPP) 100 with selectable subprecision. The floating-point processor 100 includes a floating-point register file (FPR) 110; a floating-point controller (CTL) 130; and a floating-point mathematical operator (FPO) 140. The floating-point processor 100 may be implemented as part of the main processor, a coprocessor, or a separate entity connected to the main processor through a bus or other channel.

The floating-point register file 110 may be any suitable storage medium. In the embodiment shown in FIG. 1, the floating-point register file 110 includes several addressable register locations 115-1 (REG1), 115-2 (REG2), . . . 115-N (REGN), each configured to store an operand for a floating-point operation. The operands may include, for example, data from a memory and/or the results of previous floating-point operations. Instructions provided to the floating-point processor may be used to move the operands to and from the main memory.

Figure 2:
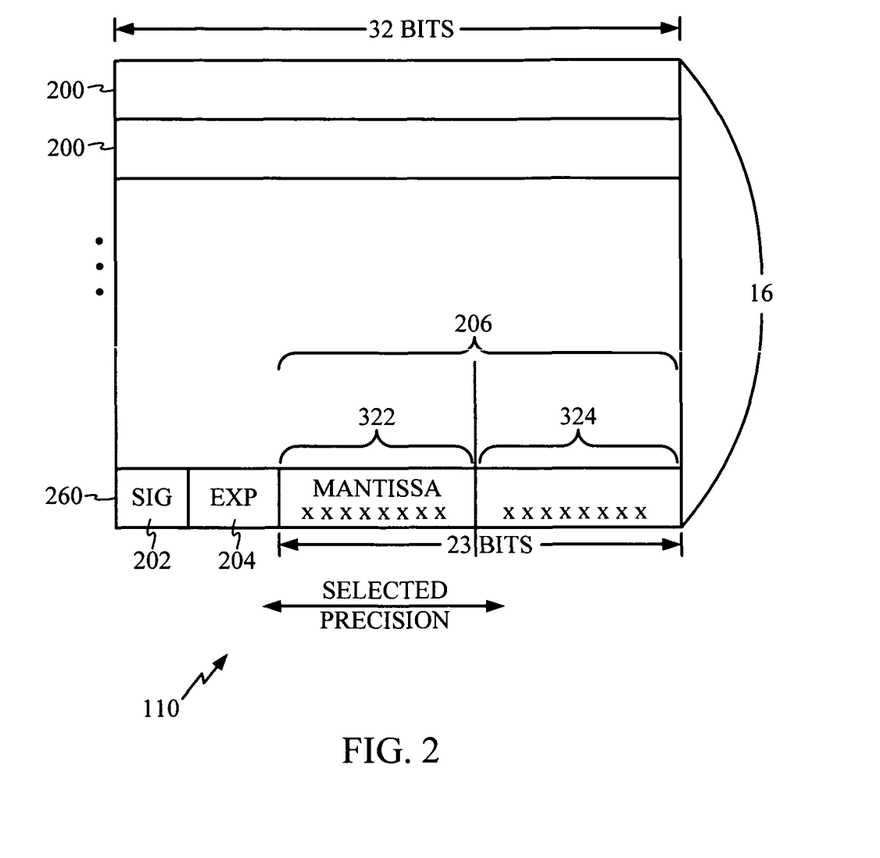
FIG. 2 is a graphical illustration of an example of a floating-point register file used in a floating-point processor with selectable subprecision.

FIG. 2 schematically illustrates an example of the data structure for a floating-point register file 110 used in a floating-point processor 100 with selectable subprecision, as described in conjunction with FIG. 1. In the embodiment illustrated in FIG. 2, the floating-point register file 110 includes sixteen addressable register locations, each register location being referred to with reference numeral 200 in FIG. 2 for convenience. Each register location 200 is configured to store a 32-bit binary floating-point number, in an IEEE-754 32-bit single format. In particular, each register location 200 contains a 1-bit sign 202, an 8-bit exponent 204, and a 24-bit fraction 206. It should of course be understood, however, that other embodiments of the floating-point processor 100 may include a floating-point register file 110 that is formatted differently from IEEE 32-bit single format (including but not limited to IEEE 64-bit double format), and/or may contain a different number of register locations.

Referring back to FIG. 1, the floating-point controller 130 may be used to select the subprecision of the floating-point operations using a control signal 133. A control register (CRG) 137 may be loaded with subprecision select bits for example transmitted in the control field of one or more instructions. In a manner to be described in greater detail later, the subprecision select bits may be used by the floating-point controller 130 to reduce the precision of the operands. The subprecision select bits may also be used to turn off portions of the floating-point processor 100. By way of example, the subprecision select bits may be used to remove power from the floating-point register elements for the bits that are not required for the subprecision selected. The subprecision select bits may also be used to remove power from logic in the floating-point operator FPO 140 that is not used when the selected subprecision is reduced. A series of switches may be used to remove and apply power to the floating-point register elements and logic in the floating-point operator 140. The switches, which may be internal or external to the floating-point register 110 and the floating-point operator 140, may be field effect transistors or any other type of switches.

The floating-point operator 140 may include one or more components configured to perform the floating-point operations. These components may include, but are not limited to, computational units such as a floating-point adder (ADD) 142 configured to execute floating-point add and subtract instructions, and a floating-point multiplier (MUL) 144 configured to execute floating-point multiply instructions. As seen in FIG. 1, each of the computational units ADD 142 and MUL 144 in the floating-point operator 140 is coupled to each other and to the floating-point register file 110 in a way as to allow operands to be transferred between the computational units, as well as between each computational unit and the floating-point register file 110. The floating point operator may be coupled to the floating point register through individual connections 134, 135, 136, 137, 138 and 139, as illustrated or may be coupled via a bus or any other suitable coupling. In at least one embodiment of the floating-point processor 100, the output of any one of the computational units (ADD 142 and MUL 144) may be the input of any other computational unit. The floating-point register file 110 may be used for storing intermediate results, as well as the results that are output from the floating-point operator 140.

The adder 142 may be a conventional floating-point adder, configured to perform standard arithmetic operations in a floating-point format. The multiplier 144 may be a conventional floating-point multiplier, configured to perform floating-point multiplication. The multiplier 144 may implement with, by way of example, a Booth or modified Booth algorithm, and may include partial product generation logic that generates partial products, and a number of carry-save adders that add up the partial products.

While for simplicity only an adder 142 and a multiplier 144 are shown in FIG. 1, the floating-point operator 140 may also include other computation units (not shown), which are known in the art, and which are configured to execute other types of floating-point mathematical operations. These computational units may include, but are not limited to: a floating-point divider configured to perform floating-point divide instructions; a floating-point square-root extractor configured to perform floating-point square-root extract instructions; a floating-point exponential operator configured to execute floating-point exponential instructions; a floating-point logarithmic operator configured to perform instructions for calculating logarithmic functions; and a floating-point trigonometric operator configured to perform instructions for calculating trigonometric functions.

Different embodiments of the floating-point processor 100 may include only one, or some, or all of the computational units listed above. For example, the adder 142 and the multiplier 144 may each include one or more well-known conventional subunits such as aligners that align input operands, normalizers that shift the result into standard format, and rounders that round the result based on a specified rounding mode. Well-known circuit elements such as bit-inverters, multiplexers. counters, and combinatorial logic circuits are also included in the adder 142 and the multiplier 144.

As illustrated in FIG. 1, the floating-point operator 140 is coupled to the floating-point register file 110 so that for each instruction of a requested floating-point operation, the relevant computational unit, i.e. the adder 142 or the multiplier 144, can receive from the floating-point register file 110 one or more operands stored in one or more of the register locations REG1, . . . , REGN.

Upon receiving the operands from the floating-point register file 110, one or more computational units in the floating-point operator 140 may execute the instructions of the requested floating-point operation on the received operands, at the subprecision selected by the floating-point controller 130. The output may be sent back to the floating-point register 110 for storage, as shown in FIG. 1.

In an embodiment of the floating-point processor 100, a software selectable mode may be used to reduce the precision of the floating-point operations under program control or as explained above, the instructions provided to the floating-point processor 100 may include a programmable control field containing the subprecision select bits. The subprecision select bits are written to the control register 137, which in turn controls the bit length of the mantissa for each operand during the floating-point operation. Alternatively, the subprecision select bits may be written to the control register 137 directly from any suitable user interface, including for example but not limited to a monitor screen/keyboard or mouse 150 shown in FIG. 1. In another embodiment of the floating-point processor 100, the subprecision selection bits may be written to the control register 137 directly from the main processor, or its operating system. The control register 137, which is shown in the floating-point controller 130, may reside elsewhere as a stand-alone entity, integrated into another entity, or distributed across multiple entities.

The subprecision select bits may be used to reduce the precision of the floating-point operation. This may be achieved in a variety of ways. In one embodiment, the floating-point controller 130 may cause power to be removed from the floating-point register elements for the excess bits of the fraction that are not required to meet the precision specified by the subprecision select bits. By way of example, if each location in the floating-point register file contains a 23-bit fraction, and the subprecision required for the floating-point operation is 10-bits, only the 9 commonly significant bits (MSBs) of the fraction are required; the hidden or integer bit makes the tenth. Power can be removed from the floating-point register elements for the remaining 14 fraction bits. If the subprecision for one or more instructions is increased to 16-bits, then the 15 MSBs of the mantissa will be required. In the latter case, power may be removed from the floating-point register elements for the 8 least-significant bits (LSBs) of the fraction.

In addition, the logic in the floating-point operator 140 corresponding to the excess mantissa bits do not require power. Thus, power savings may be achieved by removing power to the logic in the floating-point operator 140 that remains unused as a result of the subprecision selected.

Figure 3A:
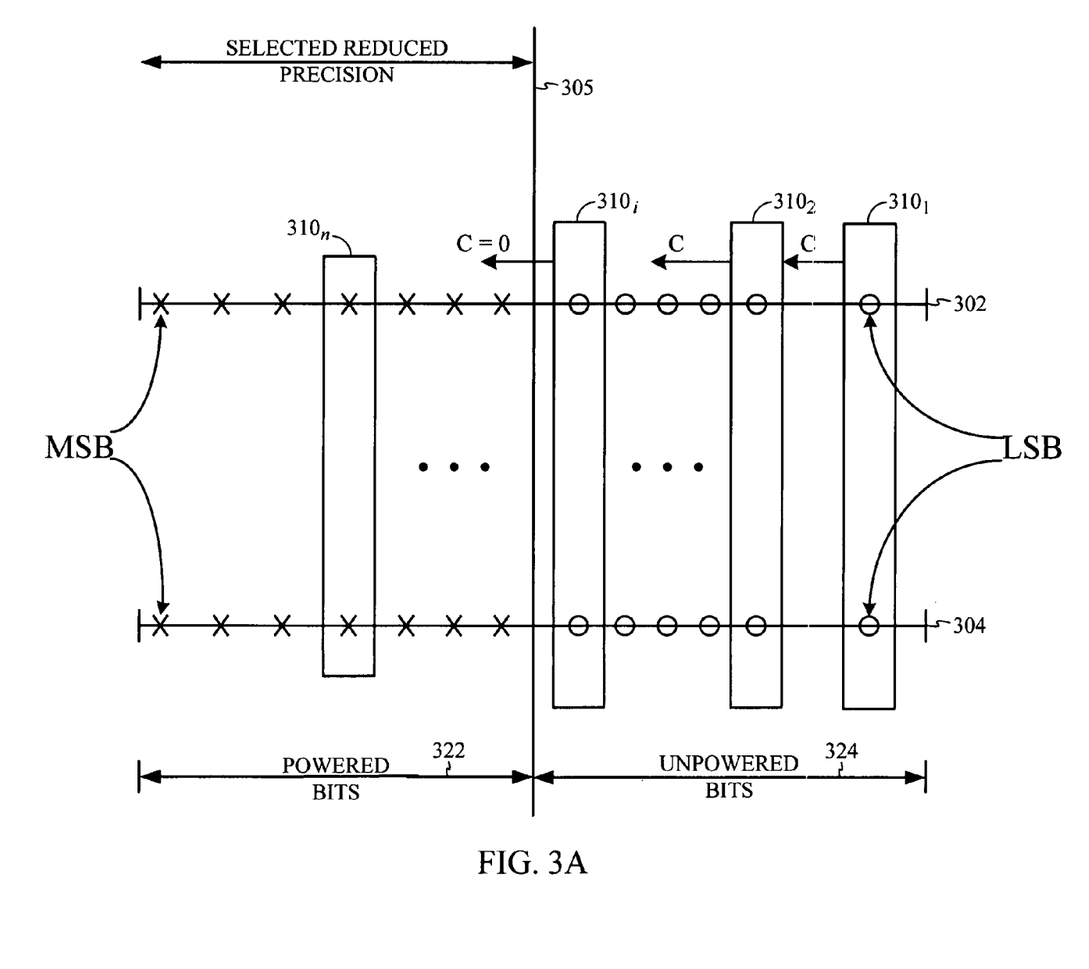
FIG. 3A is a conceptual diagram illustrating an example of a floating-point addition performed using a floating-point processor with selectable subprecision.

FIG. 3A is a conceptual diagram illustrating an example of a floating-point addition operation with power being selectively applied to logic in the floating-point operator. In particular, FIG. 3A conceptually illustrates a floating-point addition operation with two input floating-point numbers 302 and 304, each characterized by the selected subprecision, added together. For simplicity, it is assumed that the two numbers 302 and 304 have already been aligned, so that no shifting need be done. The floating-point addition operation in the full precision mode is performed through a succession of stages, referred to in FIG. 3A with reference numerals $310_1, 310_2, \ldots, 310_i, \ldots 310_n$. In accordance with standard convention, the floating-point register stores in order the bits that make up each number, ranging from a rightmost LSB to a leftmost MSB. Each successive one of the stages moving from right to left across the FIG. 3A involves bits that have an increased significance compared to bits involved in the preceding stages.

In the example illustrated in FIG. 3A, the selected subprecision is represented with a line 305. Power may be removed from the logic used to implement each stage to the right of the line 305. The carry-out C from the last powered down stage $310_i$ is forced to zero. Power is supplied only to the logic used to implement each stage to the left of the line 305. In FIG. 3A, the powered bits provided to the active stages of the floating-point operator are shown as Xs, using reference numeral 322, while the unpowered bits provided to the stages with power removed are shown as circles, using reference numeral 324.

Figure 3B:
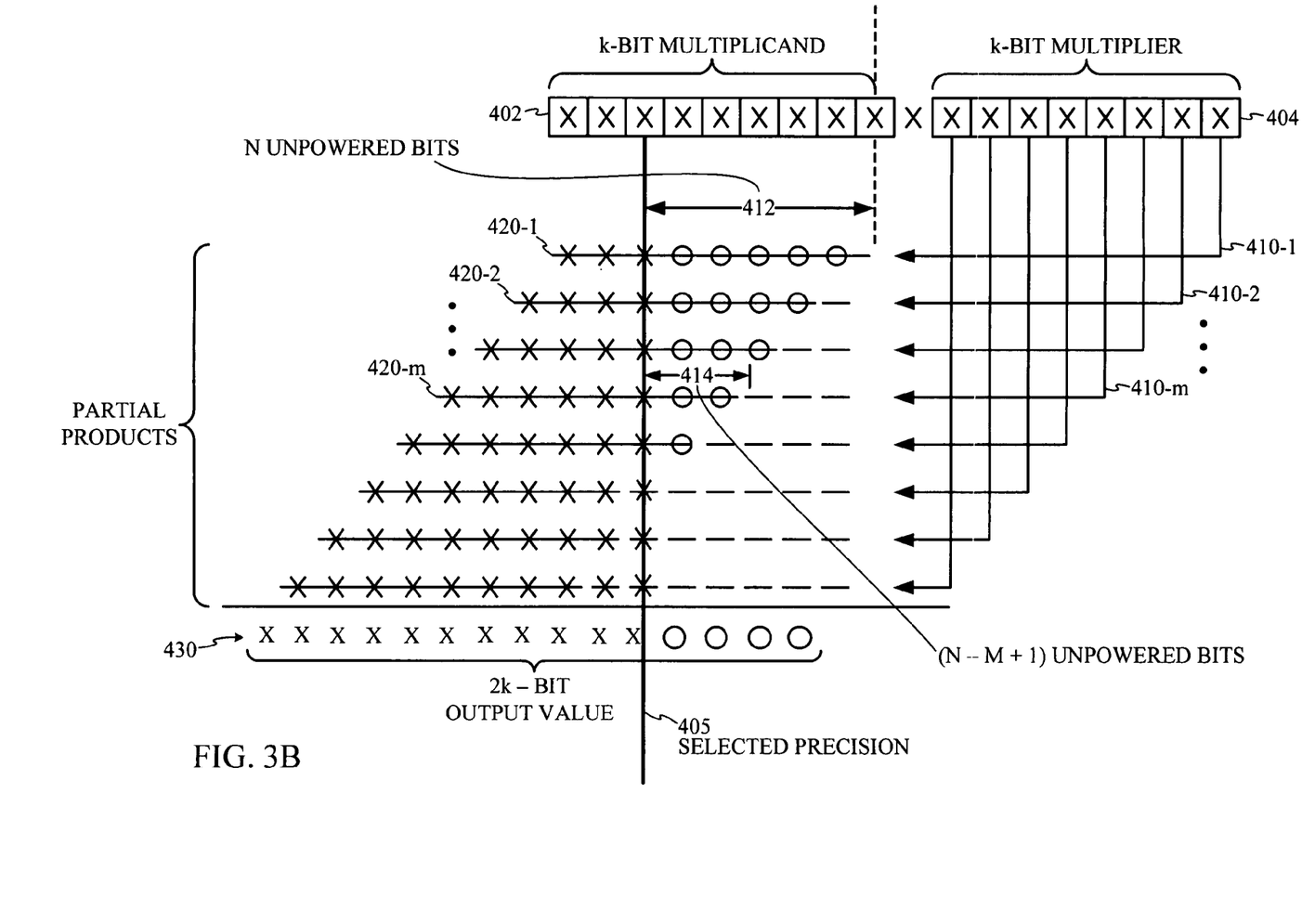
FIG. 3B is a conceptual diagram illustrating an example of a floating-point multiplication that is performed using a floating-point processor with selectable subprecision.

FIG. 3B is a conceptual diagram illustrating an example of a floating-point multiplication operation with power being selectively applied to logic in the floating-point operator. The floating-point multiplication operation is performed in the floating-point multiplier MUL, shown in FIG. 1 with reference numeral 144. It is in the multiplier that a substantial amount of logic can be powered down, providing significant power savings. Binary multiplication as illustrated in FIG. 3B is basically a series of additions of shifted floating-point numbers. In the illustrated embodiment, binary multiplication is performed between a k-bit multiplicand 402 and a k-bit multiplier 404, using a shift-and-add technique. The shift-and-add technique may be replaced by a Booth's algorithm, or a modified Booth algorithm multiplier.

As in the case of floating-point addition, floating-point multiplication is performed in a series of stages, illustrated in FIG. 3B as 410-1, . . . , 410-m. Assuming for simplicity that Booth's algorithm is used, one partial product is generated for every bit in the multiplier 404, a partial product 420-i being generated during a corresponding stage 410-i. If the value of the multiplier is 0, its corresponding partial product consists only of 0s; if the value of the bit is 1, its corresponding partial product is a copy of the multiplicand. Each partial product 420-i is left-shifted, as a function of the multiplier bit with which it is associated, after which the operation moves on to the next stage. Each partial product can thus be viewed as a shifted number. The partial product associated with bit 0 in the multiplier is left-shifted zero bits, and the partial product associated with bit 1 is left-shifted one bit. The partial products or shifted floating-point numbers 420-i are added together to generate the output value 430 for the multiplication.

In the embodiment illustrated in FIG. 3B, the selection of a desired reduced precision by the controller 130 is indicated with a line 405. As in the case of floating-point addition, described in conjunction with FIG. 3A, power may be removed from the logic used to implement the stages to the right of the line 405. Power is only applied to the stages that are actually needed to support the selected subprecision, i.e., the stages to the left of the line 405. In FIG. 3B, the bits provided to the powered on logic are shown as Xs, while the bits provided to the powered down stages are shown as circles.

As seen from FIG. 3B, for the first partial product 420-1, the logic for a number of bits N, shown using reference numeral 412, is unpowered. For the second partial product, the logic for N−1 bits is unpowered, and so forth. For the m-th partial product or shifted floating-point number 420-m, the logic for a number (N−m+1) of bits, shown using reference numeral 414, is unpowered. The number of bits N is chosen so that the precision of the remaining stages is not adversely affected.

The output value, resulting from the floating-point multiplication described above, has a width (i.e. number of bits) that is equal to the sum of the widths of the two input values 402 and 404 that are being multiplied together. The output value 430 may be truncated to the selected subprecision, i.e. any of the bits of the output value 430 that are in less the selected precision may be truncated, to generate a truncated output number characterized by the selected precision. Alternatively, the output value 430 may be rounded off to the selected precision. In either case the output bits less significant than the selected precision may also be unpowered.

The various illustrative logical units, blocks, modules, circuits, elements, and/or components described in connection with the embodiments disclosed herein may be implemented or performed in a floating-point processor that is part of a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing a floating-point operation with a floating-point processor operable to perform floating point operations having a first precision, the method comprising:
    determining a subprecision less than the first precision for the floating-point operation, wherein the subprecision is determined based on information included in an executable instruction to perform the floating-point operation, the information indicating a number of selected bits of at least one input operand associated with the floating-point operation, and wherein the subprecision corresponds to the number of selected bits and the number of selected bits is less than a width associated with the at least one input operand;
    removing power from a portion of logic circuitry to prevent processing of unselected bits of the at least one input operand associated with the floating-point operation; and
    performing the floating-point operation at the subprecision using powered portions of the logic circuitry to generate a resulting output.

2. The method of claim 1, further comprising forcing a carry-out value to zero from a stage of the portion of the logic circuitry.

3. The method of claim 1, wherein the number of selected bits of the at least one input operand is received from a user interface.

4. The method of claim 1, further comprising removing power from portions of registers within a register file using a series of switches, wherein the portions of registers within the register file correspond to the unselected bits of the at least one input operand and wherein the floating-point operation at the subprecision is performed using powered portions of the registers within the register file.

5. The method of claim 4, wherein the switches are field effect transistors.

6. The method of claim 4, wherein the switches are internal to the portions of registers within the register file.

7. The method of claim 4, wherein the switches are external to the portions of registers within the register file.

8. The method of claim 1, wherein intermediate results from performing the floating-point operation and the resulting output are stored in a register file.

9. The method of claim 1, wherein the number of selected bits correspond to most significant bits in the least one input operand and the unselected bits correspond to least significant bits in the at least one input operand.

10. The method of claim 1, wherein the subprecision corresponding to the number of selected bits controls a bit length associated with a mantissa used for the at least one input operand in the floating-point operation performed at the subprecision.

11. A floating-point processor having a first precision, the floating-point processor comprising:
a floating-point controller configured to:
select a subprecision less than the first precision for a floating-point operation, wherein the selected subprecision corresponds to a number of selected bits of at least one input operand associated with the floating-point operation and results in one or more excess bits corresponding to a difference between a width associated with the at least one input operand and the number of selected bits of the at least one input operand; and
remove power from a portion of logic circuitry to prevent the portion of the logic circuitry from processing the one or more excess bits corresponding to the difference between the width associated with the at least one input operand and the number of selected bits of the at least one input operand; and
a floating-point operator configured to perform the floating-point operation at the subprecision using powered portions of the logic circuitry to generate a resulting output.

12. The floating-point processor of claim 11, wherein the floating-point operator includes a floating-point adder and wherein intermediate results from performing the floating-point operation and the resulting output are stored in a register file.

13. The floating-point processor of claim 12, wherein the floating-point operator is further configured to force a carry-out to zero from a stage of the portion of the logic circuitry when the power is removed from the portion of the logic circuitry.

14. The floating-point processor of claim 11, wherein the floating-point controller is further configured to remove power from portions of registers within a register file in the floating-point processor used to perform the floating-point operation for the one or more excess bits resulting from the selected subprecision, and wherein the floating-point operator is further configured to perform the floating-point operation at the subprecision to generate the resulting output using powered portions of the registers.

15. The floating-point processor of claim 11, wherein the number of selected bits corresponding to the selected subprecision is indicated in a programmable control register associated with the floating-point controller.

16. The floating-point processor of claim 11, wherein the number of selected bits corresponding to the selected subprecision is indicated in an executable instruction to perform the floating-point operation.

17. The floating-point processor of claim 11, wherein the number of selected bits correspond to most significant bits in the least one input operand and the one or more excess bits correspond to least significant bits in the at least one input operand.

18. The floating-point processor of claim 11, wherein the subprecision corresponding to the number of selected bits controls a bit length associated with a mantissa used for the at least one input operand in the floating-point operation performed at the subprecision.

19. A floating-point processor having a first precision, the floating-point processor comprising:
a floating-point register having a plurality of storage elements configured to store one or more floating-point numbers;
a floating-point operator configured to perform a floating-point operation on the one or more floating-point numbers stored in the floating-point register; and
a floating-point controller configured to:
determine a subprecision less than the first precision for the floating-point operation, wherein the subprecision is determined based on information included in an executable instruction to perform the floating-point operation, the information indicating a number of selected bits of at least one of the one or more floating-point numbers associated with the floating-point operation, and wherein the subprecision corresponds to the number of selected bits and the number of selected bits is less than a width associated with the at least one floating-point number; and
remove power from a portion of logic circuitry to prevent processing of unselected bits of the at least one floating-point number.

20. The floating-point processor of claim 19, wherein the floating-point controller is further configured to remove power from portions of the storage elements using a series of switches, and wherein the portions of the storage elements correspond to the unselected bits of the at least one floating-point number.

21. The floating-point processor of claim 20, wherein the switches are internal to the storage elements.

22. The floating-point processor of claim 20, wherein the switches are external to the storage elements.

23. The floating-point processor of claim 19, wherein the floating-point operation is performed using powered portions of the logic circuitry.

24. The floating-point processor of claim 19, wherein the floating-point operation includes a multiple stage bit addition operation and one or more stages of the multiple bit addition operation are powered down in accordance with the subprecision, and wherein a carryout value from a last powered down stage is forced to a logic zero value.

25. The floating-point processor of claim 19, wherein the number of selected bits correspond to most significant bits in the least one floating-point number and the unselected bits correspond to least significant bits in the at least one floating-point number.

26. The floating-point processor of claim 19, wherein the subprecision corresponding to the number of selected bits controls a bit length associated with a mantissa used for the at least one floating-point number in the floating-point operation performed at the subprecision.

27. A floating-point processor having a maximum precision, the floating-point processor comprising:
a floating-point register configured to store one or more floating-point numbers;
a floating-point operator having logic circuitry configured to perform a floating-point operation at a subprecision; and
a floating-point controller configured to:
determine the subprecision less than the maximum precision for the floating-point operation, wherein the subprecision is determined based on information included in an executable instruction to perform the floating-point operation, the information indicating a number of selected bits of at least one of the stored floating-point numbers associated with the floating-point operation, and wherein the subprecision corresponds to the number of selected bits and the number of selected bits is less than a width associated with the at least one floating-point number; and remove power from a portion of the logic circuitry to prevent processing of unselected bits of the at least one floating-point number;

wherein the floating-point operator performs the floating-point operation using powered portions of the logic circuitry.

28. The floating-point processor of claim 27, wherein the floating-point operator includes a floating-point adder, a floating-point multiplier, or both.

29. The floating-point processor of claim 28, wherein the floating-point operator is further configured to force a carry-out to zero from a stage of the portion of the logic circuitry when the power is removed from the portion of the logic circuitry.

30. The floating-point processor of claim 27, wherein the number of selected bits correspond to most significant bits in the least one floating-point number and the unselected bits correspond to least significant bits in the at least one floating-point number.

31. The floating-point processor of claim 27, wherein the subprecision corresponding to the number of selected bits controls a bit length associated with a mantissa used for the at least one floating-point number in the floating-point operation performed at the subprecision.

32. A non-transitory processor-readable storage medium comprising instructions that, when executed by a processor, cause the processor to:

determine a subprecision less than a first precision for a floating-point operation, wherein the subprecision is determined based on information included in an executable instruction to perform the floating-point operation, the information indicating a number of selected bits of at least one input operand associated with the floating-point operation, and wherein the subprecision corresponds to the number of selected bits and the number of selected bits is less than a width associated with the at least one input operand;

remove power from a portion of logic circuitry to prevent processing of unselected bits of the at least one input operand having the floating-point number format; and perform the floating-point operation at the subprecision using powered portions of the logic circuitry to generate a resulting output.

33. An apparatus comprising:

means for determining a subprecision less than a first precision for a floating-point operation, wherein the subprecision is determined based on information included in an executable instruction to perform the floating-point operation, the information indicating a number of selected bits of at least one input operand associated with the floating-point operation, and wherein the subprecision corresponds to the number of selected bits and the number of selected bits is less than a width associated with the at least one input operand;

means for removing power from a portion of logic circuitry to prevent processing of unselected bits of the at least one input operand having the floating-point number format; and means for performing the floating-point operation at the subprecision using powered portions of the logic circuitry to generate a resulting output.

* * * * *